United States Patent [19]
Jurca

[11] Patent Number: 5,933,240
[45] Date of Patent: Aug. 3, 1999

[54] METHOD AND APPARATUS FOR DETERMINING THE DISTANCE BETWEEN A BASE AND A SPECULAR SURFACE BY MEANS OF RADIATION REFLECTED AT THE SURFACE

[76] Inventor: Marius Christian Jurca, In den Muehlgaerten 24, D-63755 Alzenau, Germany

[21] Appl. No.: 08/799,406

[22] Filed: Feb. 12, 1997

[51] Int. Cl.$^6$ .............................. G01B 11/24; G02B 5/14
[52] U.S. Cl. ................ 356/375; 356/3.11; 356/139.03
[58] Field of Search .................... 356/376, 375, 356/3.06, 3.11, 371, 135.03, 152.02; 250/205

[56] References Cited

U.S. PATENT DOCUMENTS

| | | | |
|---|---|---|---|
| 3,815,994 | 6/1974 | Peckham | 250/205 |
| 4,281,245 | 7/1981 | Brogardh et al. | 250/205 |
| 4,736,247 | 4/1988 | Graham et al. | |
| 5,146,290 | 9/1992 | Hartrumpf | 356/3.11 |
| 5,414,517 | 5/1995 | Furuhashi | 356/376 |

FOREIGN PATENT DOCUMENTS

| | | |
|---|---|---|
| 4026956A1 | 3/1992 | Germany. |
| 2176963 | 1/1987 | United Kingdom. |

OTHER PUBLICATIONS

"A Photoelectric Range Scanner Using An Array of LED Chips," by Jamusz A. Marszalec and Heimo M. Keranen, Proceedings of the International Conference on Robotics and Automation, Nice, May 12–14, 1992, Bd. vol. 1, Nr. Conf. 8, May 12, 1992, Institute of Electrical and Electronics Engineers, pp. 593–598.

*Primary Examiner*—F. G. Font
*Assistant Examiner*—Zandra V. Smith
*Attorney, Agent, or Firm*—Laubscher & Laubscher

[57] ABSTRACT

The invention relates to a method and an apparatus for determining the distance (h) between a base (1) and a specular surface (2) of an object (3). The method is based on the measurement of the direct reflection of radiation of a first light source (4) by a first detector (5) and the measurement of radiation of a second light source (6), located at least approximately at the location of the first detector (5), by a second detector (7), located at least approximately at the location of the first light source (4), in order then to determine with the known geometry of the setup and the measured values obtained for the angles of appearance ($\gamma$, $\alpha$) of the virtual images of the light sources (4, 6) the position with respect to the base (1) of the specular surface (2) to be measured.

7 Claims, 5 Drawing Sheets

METHOD AND APPARATUS FOR DETERMINING THE DISTANCE BETWEEN A BASE AND A SPECULAR SURFACE BY MEANS OF RADIATION REFLECTED AT THE SURFACE

BACKGROUND OF THE INVENTION

1. Field of the Invention

The present invention relates to a method and an apparatus for optical distance measurement with respect to specular surfaces.

2. Brief Description of the Prior Art

The customary triangulation theorem for optical distance measurement is based on a measurement of the angular position of a stray light spot, which is produced by a light beam (for example laser) on the surface to be measured. This theorem encounters considerable difficulties in the case of highly reflective surfaces, since they reflect the incident light in accordance with the law of reflection only in one direction and do not scatter it, or only to a slight extent, in the direction of the receiver.

SUMMARY OF THE INVENTION

The invention is based on the object of overcoming the problem described above in optical distance measurement with respect to specular surfaces and of providing a method and an apparatus to allow the distance from specular surfaces to be determined continuously and without requiring adjustment.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
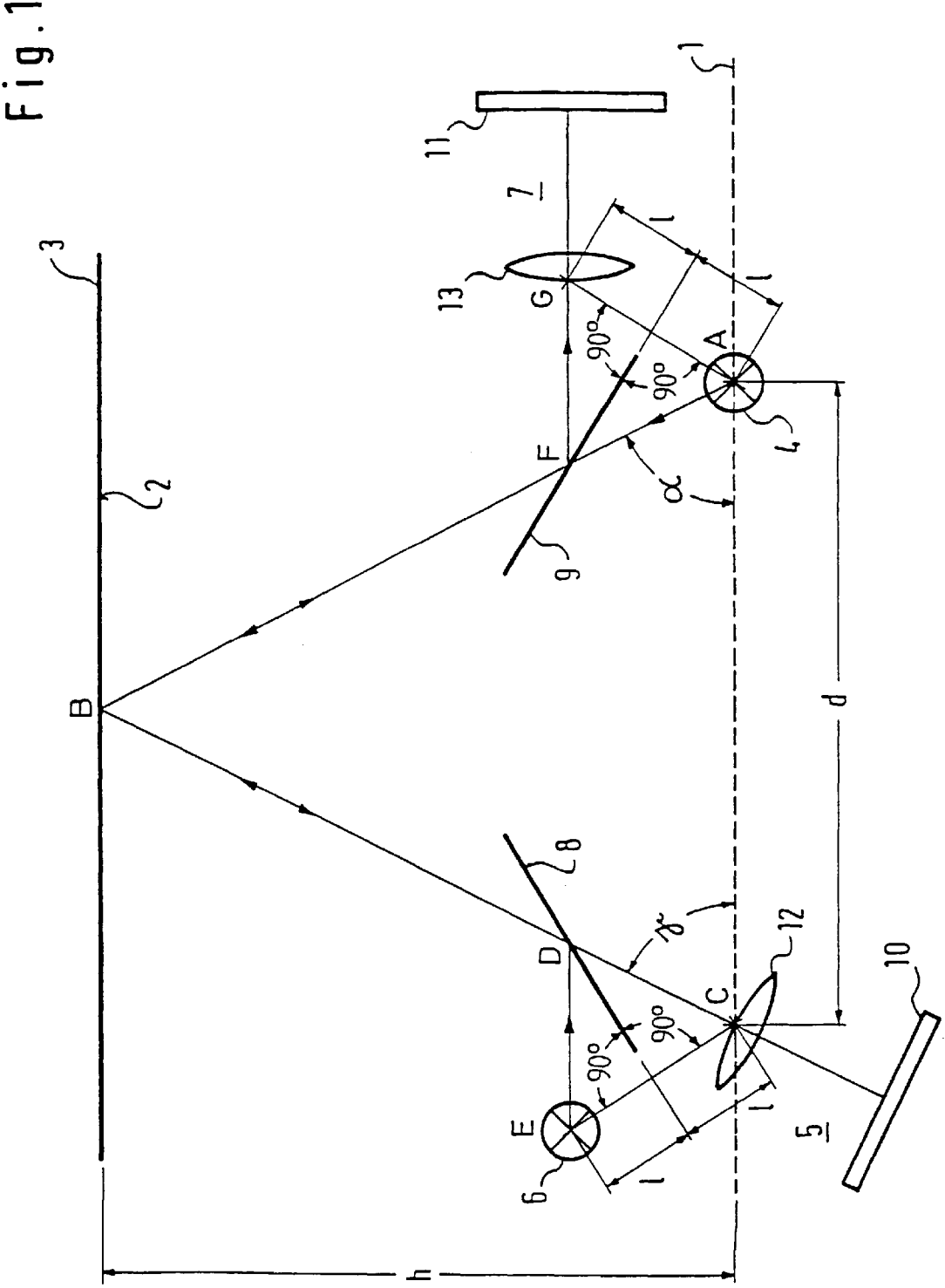
FIG. 1 is a diagrammatic view of a first embodiment of the distance measuring apparatus of the present invention, wherein the specular surface to be measured lies parallel to the base.

A method for determining the distance h between a base 1 and a specular surface 2 of an object 3 is characterized by the following steps:

a) by means of a first light source 4, located on the base 1, the specular surface 2 is divergently illuminated;

b) by means of a first detector 5, situated on the base 1, the angle of appearance A, relative to the base 1, of the virtual image of the first light source 4 is measured by detection of the radiation of the first light source 4 reflected at the specular surface 2;

c) by means of a second light source 6, provided at least approximately at the location of the first detector 5, the specular surface 2 is divergently irradiated;

d) by means of a second detector 7, situated at least approximately at the location of the first light source 4, the angle of appearance α, relative to the base 1, of the virtual image of the second light source 6 is measured by detection of the radiation of the second light source 6 reflected at the specular surface 2; and e) determination of the distance h with the aid of the two angles of appearance γ, α and the distance d between the apexes C, A of the two angles of appearance γ, α.

By measurement according to the invention of the direct reflection of two light sources by two detectors in accordance with the law of reflection and on the precondition that both light sources are situated at the same point B on the specular surface when viewed from the in each case differently positioned detector, distances from specular surfaces can be determined in a simple way without it being necessary to displace light sources or detectors to search for points of reflection.

An advantageous development of the method is the determination of the distance h by the following equation:

$$h = \frac{d}{\frac{1}{\tan\alpha} + \frac{1}{\tan\gamma}}$$

where:
 d=distance between the apexes C, A of the two angles of appearance γ, α;
 α=angle of appearance of the virtual image of the second light source 6 at the specular surface 2 relative to the base 1; and
 γ=angle of appearance of the virtual image of the first light source 4 at the specular surface 2 relative to the base 1.

The advantage of using this equation for determining h is that it is simple and quick to apply. All that is necessary to obtain the desired result is to enter the known variable d and the measured angles of appearance γ and α.

Another advantageous development of the method is the additional determination of a shift dx of a point of reflection on the specular surface 2 towards the centre of the distance d, which is determined as follows:

$$dx = d\frac{1}{2} - \frac{1}{1 + \frac{\tan\alpha}{\tan\gamma}}$$

where:
 d=distance between the apexes C, A of the two angles of appearance γ, α;
 α=angle of appearance of the virtual image of the second light source 6 at the specular surface 2 relative to the base 1; and
 γ=angle of appearance of the virtual image of the first light source 4 at the specular surface 2 relative to the base 1.

The advantage of determining dx is that it allows any inclination there may be of the surface 2 to be measured with respect to the base 1 to be determined quickly, and that it is possible to establish at which point B exactly the distance from the base 1 was measured.

Yet another advantageous development of the method is that the two angles of appearance γ, α are measured by time-division multiplexing. This means that the two individual measurements do not influence each other by any stray light of the other measurement.

An apparatus for determining the distance h between a base 1 and a specular surface 2 of an object 3 is characterized by the following features:

a) a first light source 4, arranged on the base 1, for the divergent irradiation of the specular surface 2;

b) a first detector 5, which is arranged on the base 1 and measures the angle of appearance γ, relative to the base 1, of the virtual image of the first light source 4 by detection of the radiation of the first light source 4 reflected at the specular surface 2;

c) a second light source 6, arranged at least approximately at the location of the first detector 5, for the divergent irradiation of the specular surface 2;

d) a second detector 7, which is situated at least approximately at the location of the first light source 4 and measures the angle of appearance α, relative to the base 1, of the virtual image of the second light source 6 by detection of the radiation of the second light source 6 reflected at the specular surface 2; and e) an electronic computing device, connected at least to the detectors 5, 7, for calculating the distance h taking into account the two measured angles of appearance γ, α and the distance d between the apexes C, A of the two angles of appearance γ, α.

The advantage of this configuration is that, by the arrangement of in each case a light source at least approximately at the location of a respective detector, the beam for measuring the first angle of appearance of a virtual image of the first light source on the specular surface is identical or virtually identical to that for measuring the second angle of appearance of a virtual image of the second light source on the specular surface 2, with the result that the distance h of the base 1 from the specular surface can be determined.

A preferred configuration of the apparatus is for the first light source 4 and the second detector 7 on the one hand and the second light source 6 and the first detector 5 on the other hand to be situated on in each case different sides of a semi-transparent mirror 9, 8.

The advantage of this preferred configuration is that, with the aid of two semi-transparent mirrors 8, 9, which are located in each case in the beam of a light source via the specular surface to a detector, it is possible to place the two beams, respectively emanating from one of the two light sources, on top of each other, without a light source and a detector having to share the same location in each case.

Figure 3:
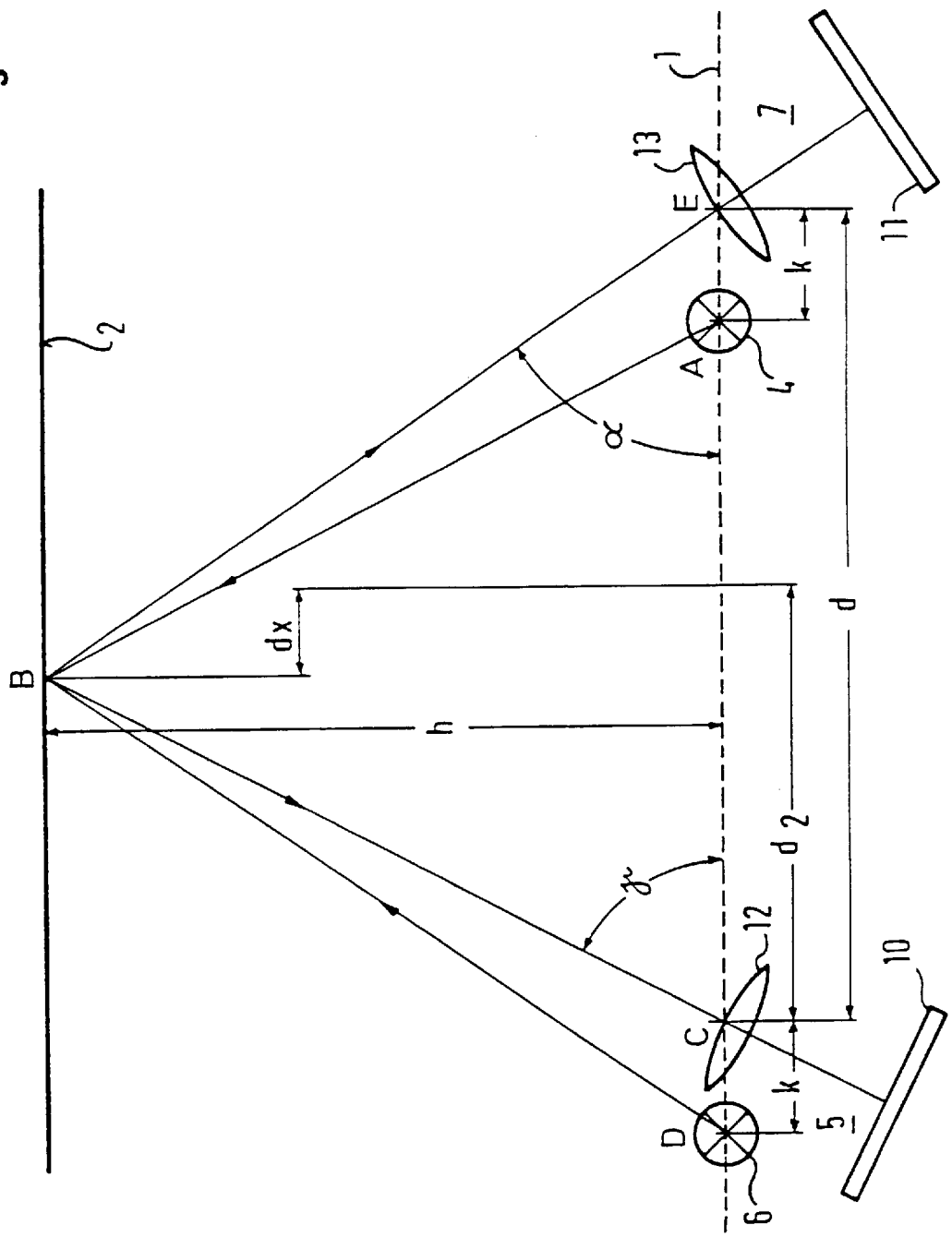
FIG. 3 is a diagrammatic view of a second embodiment of the invention with the specular surface arranged parallel with the base of the apparatus.

A further preferred configuration of the apparatus is for the light sources 4, 6 and the detectors 5, 7 to be situated on the base 1, as shown in FIG. 3.

The advantage of this further preferred configuration of the apparatus is a simple and cost-saving construction while the range of application and accuracy is not significantly restricted.

Another preferred configuration of the apparatus is for the light sources 4, 6 to be light-emitting diodes or non-collimated lasers.

The advantage of the use of light-emitting diodes is that a low-cost selection can be made, while non-collimating lasers allow a very high luminance to be produced, which makes accurate distance determination possible even in the case of a slightly soiled specular surface.

Yet another preferred configuration of the apparatus is for each detector to include a CCD sensor 10, 11 or PSD sensor 10, 11 and also a lens 12, 13, which projects the virtual image of the light source 4, 6 onto the sensor.

An advantage of this yet further preferred configuration of the apparatus is that inexpensive sensors can be used and that there is a rigid structure which supports high-speed measured-value recording without any adjustment. The resolution of the sensor allows the respective angle of appearance to be read off directly from the position of the focus of the radiation projected on it.

A very advantageous development of the apparatus is for the electronic computing device also to be connected to the light sources 4, 6 and to include a multiplexer and an analog dark-value clamp 14, (FIG. 5) in order to measure the angles of appearance γ, α by time-division multiplexing.

The advantage of this development is that the two measurements can be separated better and that it is possible to compensate for imbalances of the following main amplifiers and analog/digital converters 15, 16 by changing over the outputs Y1 and Y2 of the multiplexer and of the analog dark-value clamp 14. Furthermore, multiplexing makes it possible to use for the signal processing of the detector-output signals the same analog/digital converters 15, 16 for converting the output signals of both sensors 10, 11 and thus to establish the same conditions for both signal paths. Furthermore, the multiplexer and analog dark-value clamp 14 can store the signal values of the sensors 10, 11 during the dark phase of the light sources 4, 6 and then subtract them during the light phase from the new signal values in order to remove the ambient light component.

Referring again to FIG. 1, the first light source 4, which is arranged at the point A on a base 1, radiates a cone of light onto the specular surface 2 to be measured. At a certain distance d from the light source 4 there is located on the base 1 at the point C a detector 5 for measuring the angle of appearance γ of the virtual image of the first light source 4 at point B. The virtual image of the first light source 4 is produced by direct reflection of a beam of the first light source 4 from A at point B to point C. The beam described passes at the points D and F two semi-transparent mirrors 8, 9, which, apart from a slight parallel shift, have no influence on the geometry of the beam. This shift is corrected by means of a correction of the distance d. At the point E, which is obtained by reflection at the first semi-transparent mirror 8 from point C, there is located a second light source 6, which illuminates the specular surface 2 to be measured via the first semi-transparent mirror 8. A second detector 7 at point G, which is obtained by reflection at the second semi-transparent mirror 9 from point A, measures the angle of appearance a of the virtual image of the second light source 6. The path of the two beams is identical because of the mirror symmetry of C and E with respect to A and G between the points D, B and F. Consequently, the triangle ABC is determined completely; the distance h of the base 1 from the specular surface 2 is then:

$$h = \frac{d}{\frac{1}{\tan \alpha} + \frac{1}{\tan \gamma}}$$

and the shift dx of the point of reflection B towards the centre of the distance d between the apexes C, A of the two angles of appearance γ, α is:

$$dx = d \cdot \left[ \frac{1}{2} - \frac{1}{1 + \frac{\tan \alpha}{\tan \gamma}} \right]$$

where
α=angle of appearance of the virtual image of the second light source 6 at the specular surface 2 relative to the base 1, and γ=angle of appearance of the virtual image of the first light source 4 at the specular surface 2 relative to the base 1.

This measuring setup achieves the effect that, with the specular surface 2 in any desired attitude in certain ranges, the distance h between a base 1 and a specular surface 2 can be determined without adjustment of the measuring setup. It is further achieved by the determination of dx that the exact position of the specular surface 2 relative to the base 1 can be deter- mined. It is thus possible to determine the position and attitude of the specular surface 2 with respect to the base 1.

Figure 2:
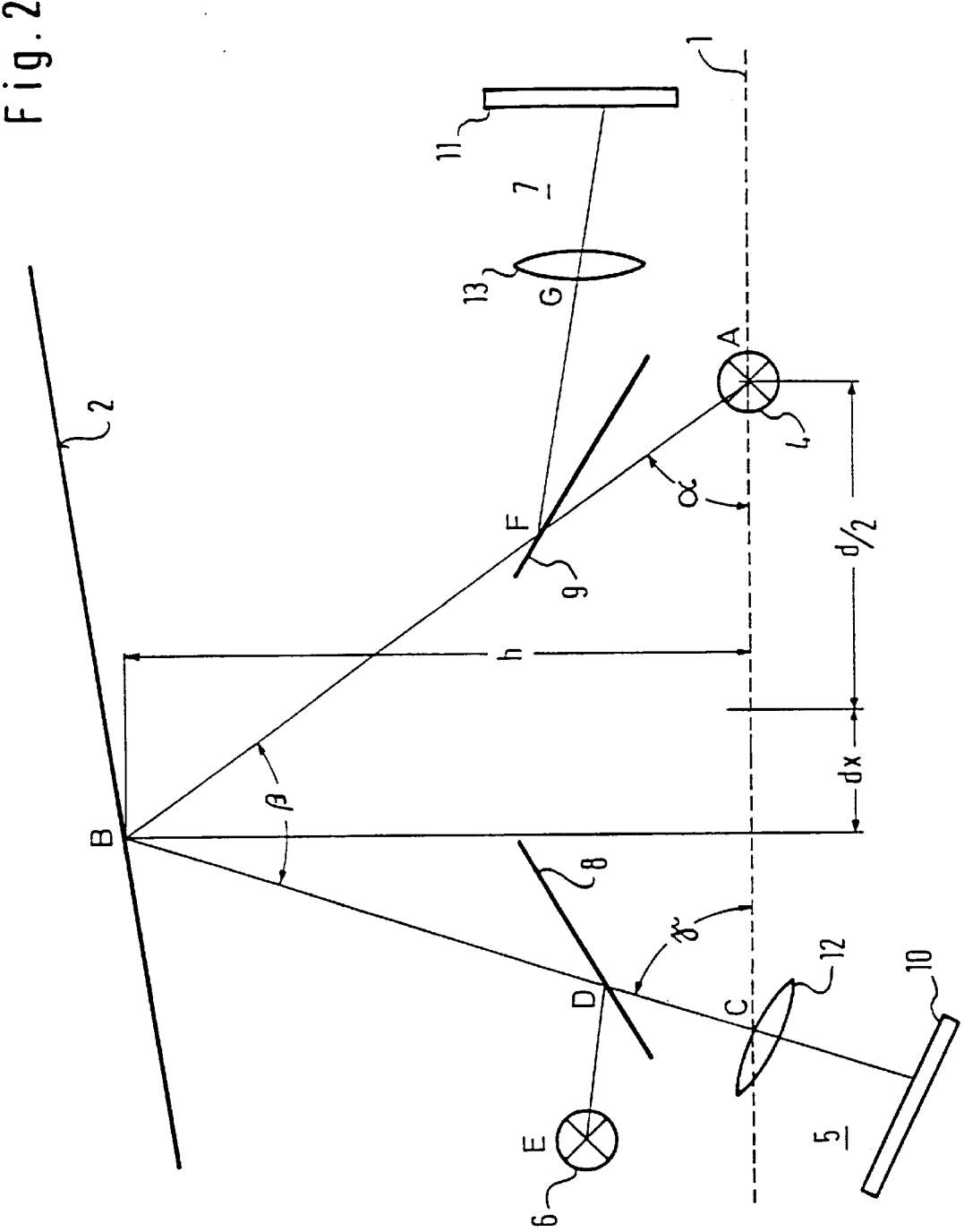
FIG. 2 is a diagrammatic view of the apparatus of FIG. 1 with the specular surface arranged at an angle to the base.

FIG. 2 shows the configuration according to FIG. 1, but now with the specular surface lying at an angle to the base.

The measuring principle is identical to that for FIG. 1. It can be seen that, with the same arrangement of the measuring setup and the surface 2 lying at an angle to the base 1, there is a shift dx towards the centre of the distance d between the two apexes C, A of the angles of appearance γ, α. This shift can be used to specify the exact position of the point B at which the two virtual images of the light sources 4, 6 are located, as seen from the associated detectors 5, 7. Consequently, the exact position and alignment of the specular surface 2 with respect to the base 1 can be determined without adjustment of the measuring setup.

FIG. 3 shows a second distance-measuring apparatus according to the invention. Here, the specular surface lies parallel to the base.

The second distance-measuring apparatus has simplified sensor geometry. Here, the two semi-transparent mirrors 8, 9 are omitted and both the light sources 4, 6 and the detectors 5, 7 are arranged on the base 1. The distances k between the first light source 4 and the second detector 7 and also between the second light source 6 and the first detector 5 must be equal and as small as possible. The beams from the first light source 4 to the first detector 5 and from the second light source 6 to the second detector 7 are reflected at the common point B only if the specular surface 2 to be measured lies parallel to the base 1. The triangle which is obtained from the two apexes E, C of the angles of appearance α, γ of the virtual images of the two light sources 6, 4 and from the point B at which the two beams are reflected is then determined completely and, as above, the distance h and the shift dx can be determined.

This still also applies in an approximate way, however, with the small distance k between the light sources 4, 6 and the detectors 7, 5 and small angles of the surface 2 to be measured. There are then two points of reflection which are very close to each other. In any event, however, the values for the distance h and the shift dx can be determined exactly by means of correction functions (for example in tabular form).

Figure 4:
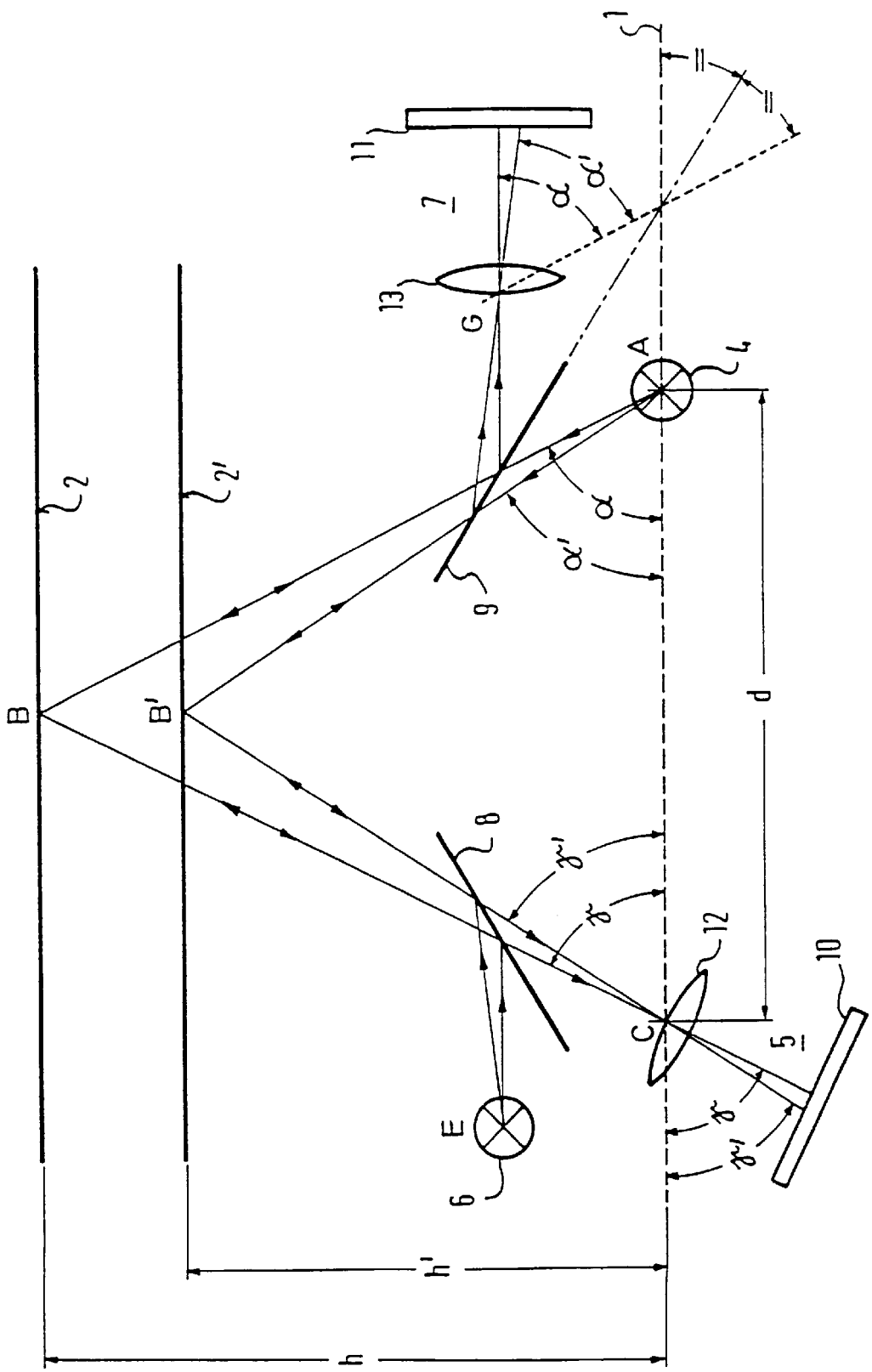
FIG. 4 is a diagrammatic view of the first embodiment with the specular surface arranged at two positions relative to the base.

FIG. 4 shows once again the first distance-measuring apparatus with the specular surface at two different distances.

The measuring principle is identical to that described for FIG. 1. It can be seen how, for different distances h, h', different angles of appearance γ, γ', α, α' of the virtual images of the light sources 4, 6 are obtained.

Figure 5:
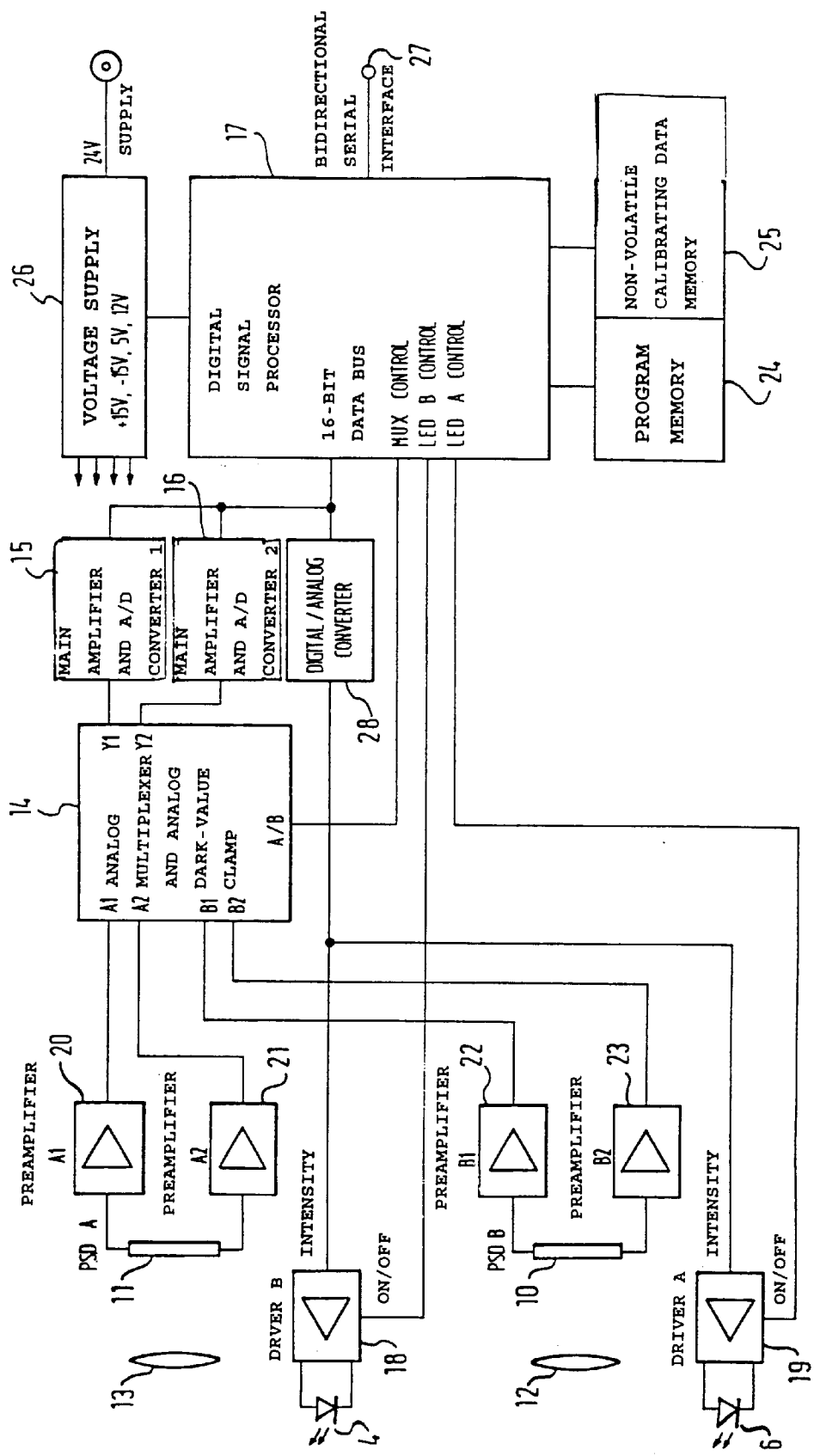
FIG. 5 is a block diagram schematic illustration of the electrical circuit of the apparatus of the present invention.

FIG. 5 shows a block diagram of electronics associated with the distance-measuring apparatuses.

Serving as light sources 4, 6 are IR light-emitting diodes, which can be switched on and off by the controlling signal processor 17 and can be controlled in their radiation intensity. These light-emitting diodes 4, 6 are controlled in both channels A and B by identically constructed power drivers 18, 19. The directional characteristics of the light-emitting diodes 4, 6 are lobar, with an aperture angle of about 30°. The diodes 4, 6 are aligned such that the reflection of the intensity maximum strikes into the opposite lens 12, 13 if the specular surface 2 to be measured is located in the centre of the measuring range and is parallel to the base 1. The power drivers 18, 19 are activated by the processor 17 via a digital/analog converter 28.

The four output signals A1, A2, B1, B2 supplied by the two PSDs 10, 11 are amplified in four identical transimpedance preamplifiers 20, 21, 22, 23. In the following analog multiplexer and the analog dark-value clamp 14, first of all the ambient light component is removed from the signals by storing the signal value during the dark phase of the light-emitting diodes 4, 6 and then subtracting it from the signals (clamping). Then, depending on the measuring phase, the signals A1, A2 or B1, B2 are switched through to the outputs Y1, Y2. In addition, it is possible to change over Y1 and Y2 in order to be able to determine imbalances of the following amplifiers and A/D converters 15, 16. The main amplifiers contained in the A/D converters 15, 16 additionally have a band-limiting function (low-pass filters). The A/D conversion itself is carried out by 12-bit resolution. In addition, the preferred configuration comprises a (FLASHPROM) program memory 24, an EEPROM calibrating data memory 25 and an electrically isolating DC-DC converter 26 for generating the various internal operating voltages.

A measuring cycle proceeds as follows:

At the beginning of a dark phase (light source 4, 6 off) lasting 15 μsec, the signal level of all four measuring channels is clamped at 0 volt (subtraction of ambient light). At the end of this dark phase, the signal values of the channels A1, A2 are A/D converted and stored in the processor 17. Then, the second light source 6 is switched on with an intensity determined from the past cycles.

After a settling time of 15 μsec, the channels A1/A2 are in turn A/D converted. The difference between these "light" values and the previously measured "dark" values is subsequently further processed as the "channel" measured value. Then, the second light source 6 is again switched off and the analog multiplexer 14 is switched over to the channels B1, B2. The same "dark" and "light" measurement is performed again, as above, for the B channels.

The sequence (A measurement, B measurement) is repeated with exchanged outputs Y1 and Y2 and the channel measured values A1, A2, B1, B2 obtained are determined.

In accordance with the formula (A1−A2)/(A1+A2) or (B1−B2)/(B1+B2), the positions of the projected light spots on the sensors 10, 11 are then determined (normalized to ±1). In addition, the received signal strength (A1+A2 or B1+B2) is assessed and the intensity of the light sources 4, 6 is corrected on this basis in order to obtain the largest possible denominator (accuracy) in the above formula without the risk of overdriving (saturation).

By means of two calibration tables, stored in the EEPROM 25, and interpolations carried out therewith, the angles of appearance γ, α are assigned the required values tan γ and tan α for determining the distance h and the shift dx. Distance and angle data are then calculated. They can then be averaged over a selectable number of measuring cycles.

For fine correction, it is also possible to calibrate out residual inaccuracies by means of a two-dimensional (angle, distance) correction table.

The measured values thus obtained are output from the device via an RS 232 interface 27.

I claim:

1. A method for determining the distance (h) between a base (1) and the specular surface (2) of an object (3), which comprises the steps of:

(a) initially divergently irradiating the specular surface solely with light energy radiated from a first light source (4) arranged adjacent the base and transmitted via a first semi-transparent mirror (9);

(b) measuring the intensity of the first light energy reflected by the specular surface as a first virtual image of the first light source and transmitted via a second semi-transparent mirror (8) upon a first detector (5) arranged at a first angle of appearance (γ) relative to the base, thereby to produce at least one first electrical signal (A1, A2);

(c) subsequently divergently irradiating the specular surface solely radiated from a second light source (6) arranged adjacent said first detector and reflected by said second mirror;

(d) measuring the intensity of the second light energy that is reflected by said specular surface and by said first mirror as a second virtual image upon a second detector (7) arranged adjacent said first light source at a second angle of appearance (α) relative to the base, thereby to produce at least one second electrical signal (B1,B2);

(e) alternatively time-division multiplexing (14) the first and second signals to determine the angles of appearance (α, γ) of the first and second virtual images relative to the base, and the distance (d) between the apices of the angles of appearance relative to the base; and (f) calculating the distance (h) between the base and the specular surface of the object.

2. Method according to claim 1, characterized in that the distance (h) is determined in accordance with the following equation:

$$h = \frac{d}{\frac{1}{\tan\alpha} + \frac{1}{\tan\gamma}}$$

where:

d=distance between the apexes (C, A) of the two angles of appearance (γ, α);

α=angle of appearance of the virtual image of the second light source (6) at the specular surface (2) relative to the base (1); and γ=angle of appearance of the virtual image of the first light source (4) at the specular surface (2) relative to the base (1).

3. Method according to claim 2, characterized in that, in addition, a shift (dx) of a point of reflection on the specular surface (2) towards the centre of the distance (d) is determined as follows:

$$dx = d \cdot \left[\frac{1}{2} - \frac{1}{1 + \frac{\tan\alpha}{\tan\gamma}}\right]$$

where:

d=distance between the apexes (C, A) of the two angles of appearance (γ, α);

α=angle of appearance of the virtual image of the second light source (6) at the specular surface (2) relative to the base (1); and γ=angle of appearance of the virtual image of the first light source (4) at the specular surface (2) relative to the base (1).

4. Apparatus for determining the distance (h) between a base (1) and the specular surface (2) of an object (3), comprising:

(a) a pair of semi-transparent mirrors (8, 9) arranged between the base and the specular surface;

(b) a first light source (4) arranged adjacent the base for irradiating the object with first light energy transmitted through a first one (9) of said mirrors;

(c) first detector means (5) for measuring the intensity of the virtual image of the first light energy light reflected from the specular surface of the object and transmitted toward the base through the second one (8) of said mirrors at a first appearance angle (γ) relative to the base, thereby to produce at lease one first electrical signal (A1, A2);

(d) a second light source (6) arranged adjacent said first detector means for irradiating the specular surface of the object with second light energy reflected off of one of said mirrors (8);

(e) second detector means (7) arranged adjacent said first light source for measuring the intensity of the virtual image of the second light energy reflected from the specular surface of the object and from the other of said mirrors (9) and having a second appearance angle (α) relative to the base, thereby to produce at least one second electrical signal (B1, B2);

(f) means for correcting the slight parallel shift in the distance (d) between the apices of the first and second virtual light images;

(g) time-division multiplexing means for alternating producing an analog output signal (Y1, Y2) that is a function of said first and second signals;

(h) analog-to-digital processor means (15, 16) for converting said output signal to a digital signal; and (i) digital signal processing means (17) for processing said output signal, including:

(1) calibrating data memory means (25) responsive to said output signal for determining the distance (d) between the apices of the first and second reflected virtual light images relative to the base, together with said first and second appearance angles (γ, α); and (2) calculating means for calculating the distance (h) between the base and the specular surface of the object in accordance with the equation:

$$h = \frac{d}{\frac{1}{\tan\alpha} + \frac{1}{\tan\gamma}}.$$

5. Apparatus for determining the distance (h) between a base (1) and the specular surface (2) of an object (3), comprising:

(a) a pair of semi-transparent mirrors (8,9), arranged between the base and the specular surface;

(b) a first light source (4) arranged adjacent the base for irradiating the object with first light energy transmitted through a first one (9) of said mirrors;

(c) first detector means (5) for measuring the intensity of the virtual image of the first light energy reflected from the specular surface of the object and transmitted toward the base through the second one (8) of said mirrors at a first appearance angle (γ) relative to the base, thereby to produce at least one first electrical signal (A1, A2);

(d) a second light source (6) arranged adjacent said first detector means for irradiating the specular surface of the object with second light energy reflected off of one of said mirrors (8);

(e) second detector means (7) arranged adjacent said first light source for measuring the intensity of the virtual image of the second light energy reflected from the specular surface of the object and from the other of said mirrors (9) and having a second appearance angle ($\alpha$) relative to the base, thereby to produce at least one second electrical signal (B1, B2);

(f) time-division multiplexing means for alternating producing an analog output signal (Y1, Y2) that is a function of said first and second signals;

(g) analog-to-digital processor means (15, 16) for converting said output signal to a digital signal; and (h) digital signal processing means (17) for processing said output signal, including:

(1) calibrating data memory means (25) responsive to said output signal for determining the distance (d) between the apices of the first and second reflected virtual light images relative to the base, together with said first and second appearance angles ($\gamma$, $\alpha$); and (2) calculating means for calculating the distance (h) between the base and the specular surface of the object in accordance with the equation:

$$h = \frac{d}{\frac{1}{\tan\alpha} + \frac{1}{\tan\gamma}}.$$

6. Apparatus as defined in claim 5, and further including means (18, 19, 28) operable by said signal processing means for varying the intensity of the light produced by said light sources, respectively, thereby to control the strength of the received signal.

7. Apparatus as defined in claim 5, wherein said mirrors are arranged generally in a plane parallel with said base.

* * * * *